(12) United States Patent
Williams

(10) Patent No.: US 11,536,511 B2
(45) Date of Patent: Dec. 27, 2022

(54) METHOD AND SYSTEM FOR LIQUIFYING A GAS

(71) Applicant: Herbert L. Williams, East Palatka, FL (US)

(72) Inventor: Herbert L. Williams, East Palatka, FL (US)

( * ) Notice: Subject to any disclaimer, the term of this patent is extended or adjusted under 35 U.S.C. 154(b) by 337 days.

(21) Appl. No.: 16/987,661

(22) Filed: Aug. 7, 2020

(65) Prior Publication Data

US 2021/0041165 A1 Feb. 11, 2021

Related U.S. Application Data

(60) Provisional application No. 62/884,382, filed on Aug. 8, 2019.

(51) Int. Cl.
*F25J 1/00* (2006.01)
*F25J 3/02* (2006.01)
*C01B 3/50* (2006.01)

(52) U.S. Cl.
CPC ............ *F25J 3/0252* (2013.01); *C01B 3/506* (2013.01); *F25J 1/001* (2013.01); *F25J 1/0005* (2013.01); *F25J 1/0047* (2013.01); *F25J 1/0052* (2013.01); *F25J 1/0072* (2013.01); *C01B 2203/046* (2013.01); *F25J 2215/10* (2013.01); *F25J 2270/20* (2013.01)

(58) Field of Classification Search
CPC ......... F25J 1/001; F25J 1/0047; F25J 1/0204; F25J 1/0005; F25J 1/0251; F25J 1/0072; F25J 1/0284; F25J 1/0012; F25J 1/0052; F25J 3/0252; F25J 2250/02; F25J 1/0245; F25J 1/12; F25J 1/0264; F25J 2260/30; F25J 2245/90; F25J 2270/20; F25J 2290/62; C01B 3/506; C01B 2203/046
See application file for complete search history.

(56) References Cited

U.S. PATENT DOCUMENTS

| | | | |
|---|---|---|---|
| 1,901,389 A | 3/1933 | Hazard-Flamand | |
| 2,952,986 A | 9/1958 | Spalding | |
| 3,300,991 A | 1/1967 | Carney | |
| 3,362,173 A | 1/1968 | Kniel | |
| 4,141,707 A | 2/1979 | Springmann | |
| 4,641,499 A * | 2/1987 | Jones | F17C 11/005 62/384 |
| 5,931,021 A | 8/1999 | Shnaid et al. | |

(Continued)

*Primary Examiner* — Frantz F Jules
*Assistant Examiner* — Webeshet Mengesha
(74) *Attorney, Agent, or Firm* — Thomas C. Saitta

(57) ABSTRACT

A method and system for producing liquid air wherein liquid refrigerant is cycled between two core tanks maintained at a temperature sufficient to liquify compressed air passed through condensing tubing in the interior of the core tanks. Liquid refrigerant is cycled by alternating high pressure gas from a high pressure tank to one of the core tanks, which forces liquid refrigerant from this tank through an expansion device to expand a portion of the liquid refrigerant to absorb heat in the other core tank, the resulting refrigerant gas being driven into a low pressure tank. A compression device transfers the refrigerant gas from the low pressure tank to the high pressure tank and maintains the pressure in the high pressure tank. Connections between the low and high pressure tanks and the core tanks are reversed with each cycle.

18 Claims, 2 Drawing Sheets

(56) References Cited

U.S. PATENT DOCUMENTS

| | | | | |
|---|---|---|---|---|
| 6,003,332 A | * | 12/1999 | Foster | C01B 32/55 62/601 |
| 6,484,533 B1 | | 11/2002 | Allam et al. | |
| 2015/0135714 A1 | * | 5/2015 | Benn | F03G 6/003 60/671 |
| 2018/0199979 A1 | * | 7/2018 | Mahrouche | C09K 5/041 |

* cited by examiner

METHOD AND SYSTEM FOR LIQUIFYING A GAS

BACKGROUND OF THE INVENTION

This invention relates generally to the field of methods and systems for the liquification of a gas, such as in the production of liquid air, hydrogen or other similar gases, and more particularly relates to such methods and systems that are cryogenic in nature. Prior art devices are excessively complicated or inefficient in the production of liquid gases, and it is an object of this invention to address those issues by providing an efficient and inexpensive system.

SUMMARY OF THE INVENTION

The invention in various embodiments is both a method and a system for the liquification of a gas, such as the production of liquid air, hydrogen or similar gases through cryogenic means. For ease of discussion, the method and system will be described with reference to the production of liquid air as representative of a compressed gas to be liquified, but it is to be understand that this is simply a convention and the subject gas is not limited to air, but may also be for example hydrogen or other similar gases capable of transforming from a gas to a liquid under certain pressure/temperature conditions. The system comprises in general a first and second core tank or reservoir retaining a refrigerant, such as nitrogen, a high pressure tank retaining the refrigerant in the gas or vapor state, a low pressure tank retaining the refrigerant in the gas or vapor state, a tank or other source of compressed air, a tank or pipeline receiving the liquid air when produced, a cylinder or similar pumping device in communication with the high pressure and low pressure tanks, and a means to operate the cylinder.

Each core tank comprises a port for passage of refrigerant vapor from and into each tank, a liquid delivery tube or conduit for dispensing liquid refrigerant from one core tank to the other core tank, and an expansion device for receiving the liquid refrigerant from the other core tank and converting the liquid refrigerant into refrigerant vapor. Each core tank is positioned within an insulation system to maintain temperatures below ambient. A routing system or distribution valve connects each port to both the high pressure tank and the low pressure tank in a manner whereby with the first core tank connected to the high pressure tank, the second core tank is connected to the low pressure tank. Likewise, with the second core tank connected to the high pressure tank, the first core tank is connected to the low pressure tank.

The cylinder is connected to the low pressure tank and the high pressure tank such that refrigerant gas may be removed from the low pressure tank and delivered to the high pressure tank, the cylinder maintaining the pressure within the high pressure tank at a much higher pressure than that of the low pressure tank.

The compressed air source or tank is connected to condensing tubing passing through each of the core tanks.

The method of producing liquid air comprises a cycling operation whereby liquid refrigerant is transferred back and forth between the two core tanks. Each core tank contains a quantity of liquid refrigerant under pressure. When the quantity of liquid refrigerant is at a pre-determined minimum level in one core tank (e.g., second core tank), the level in the other core tank (e.g., first core tank) will be at its maximum. At this point the adjustable routing system or distribution valve is positioned such that high pressure refrigerant gas is delivered from the high pressure tank into the first core tank, while simultaneously connecting the second core tank to the low pressure tank. The raised pressure in the first core tank forces liquid refrigerant through the second expansion device into the second core tank. Expansion of some of the liquid refrigerant results in a phase change from liquid to gas, thereby reducing the temperature in the second core tank. The refrigerant gas so created is passed into the low pressure tank.

When the quantity of liquid refrigerant in the first core tank reaches a pre-determined minimum level, the quantity of liquid refrigerant in the second core tank will be at its maximum level. At this point the distribution valve is reversed such that high pressure refrigerant gas is delivered from the high pressure tank into the second core tank, while simultaneously connecting the first core tank to the low pressure tank, thus reversing the cycle such that liquid refrigerant from the second core tank is delivered through the first expansion device into the first core tank.

During this continuous cycling process condensed air is passed through the condensing tubes which are situated in the lower portions of the core tanks to maximize contact with the liquid refrigerant. The temperature within the first and second core tanks is maintained at a temperature below which the condensed air phase changes into liquid air, such that the condensed air is converted to liquid air for delivery into a liquid air storage tank or piped to another location.

In alternate language, the invention is summarized as a gas liquification system comprising: a refrigerant in the form of a liquid refrigerant and a refrigerant gas; a first core tank retaining a portion of the liquid refrigerant and a portion of the refrigerant gas; a second core tank retaining a portion of the liquid refrigerant and a portion of the refrigerant gas; a low pressure tank retaining a portion of the refrigerant gas; a high pressure tank retaining a portion of the refrigerant gas at a pressure higher than the pressure within the low pressure tank; a compressing device in communication with the high pressure tank and the low pressure tank, the compressing device receiving refrigerant gas from the low pressure tank and delivering it to the high pressure tank under increased pressure; a gas source providing a compressed gas to be liquified; a first condensing tube within the first core tank and extending through the liquid refrigerant retained within the first core tank, and a second condensing tube within the second core tank and extending through the liquid refrigerant retained within the second core tank; the first and second condensing tubes receiving the compressed gas to be liquified from the gas source; a first liquid delivery tube positioned within the first core tank and extending into the liquid refrigerant retained within the first core tank and a second expansion device disposed on the second core tank, such that liquid refrigerant from the first core tank is delivered into the second core tank from the first liquid delivery tube to the second expansion device, the second expansion device enabling a portion of the liquid refrigerant delivered from the first core tank to vaporize into refrigerant gas; a second liquid delivery tube positioned within the second core tank and extending into the liquid refrigerant retained within the second core tank and a first expansion device disposed on the first core tank, such that liquid refrigerant from the second core tank is delivered into the first core tank from the second liquid delivery tube to the first expansion device, the first expansion device enabling a portion of the liquid refrigerant delivered from the second core tank to vaporize into refrigerant gas; and a routing system wherein in a first operational condition the refrigerant gas from the high pressure tank is routed to the first core tank to increase the pressure within the first core tank and refrigerant gas within the second core tank is routed to the low pressure tank, and wherein in a second operational condition the refrigerant gas from the high pressure tank is routed to the second core tank to increase the pressure within the second core tank and refrigerant gas within the first core tank is routed to the low pressure tank. Further to the above, the invention wherein the routing system comprises a four-way distribution valve; wherein the compressing device comprises a cylinder operated by a power device, the power device being chosen from the group of power devices consisting of electric motors, gas motors, wind machines and hydro turbines; further comprising a heat exchanger disposed between the compressing device and the high pressure tank; wherein the first and second expansion devices are chosen from the group of expansion devices consisting of valves, orifices, turbo-expanders expansion turbines; wherein the first and second core tanks are insulated; wherein the first and second core tanks are disposed within a vacuum; and/or wherein the first and second condensing tubes are coiled.

Alternatively, the invention is a gas liquification method comprising the steps of: (A) providing a refrigerant in the form of a liquid refrigerant and a refrigerant gas; a first core tank retaining a portion of the liquid refrigerant and a portion of the refrigerant gas; a second core tank retaining a portion of the liquid refrigerant and a portion of the refrigerant gas; a low pressure tank retaining a portion of the refrigerant gas; a high pressure tank retaining a portion of the refrigerant gas at a pressure higher than the pressure within the low pressure tank; a compressing device in communication with the high pressure tank and the low pressure tank, the compressing device receiving refrigerant gas from the low pressure tank and delivering it to the high pressure tank under increased pressure; a gas source providing a compressed gas to be liquified; a first condensing tube within the first core tank and extending through the liquid refrigerant retained within the first core tank, and a second condensing tube within the second core tank and extending through the liquid refrigerant retained within the second core tank; the first and second condensing tubes receiving the compressed gas to be liquified from the compressed gas source; a first liquid delivery tube positioned within the first core tank and extending into the liquid refrigerant retained within the first core tank and a second expansion device disposed on the second core tank, such that liquid refrigerant from the first core tank is delivered into the second core tank from the first liquid delivery tube to the second expansion device, the second expansion device enabling a portion of the liquid refrigerant delivered from the first core tank to vaporize into refrigerant gas; a second liquid delivery tube positioned within the second core tank and extending into the liquid refrigerant retained within the second core tank and a first expansion device disposed on the first core tank, such that liquid refrigerant from the second core tank is delivered into the first core tank from the second liquid delivery tube to the first expansion device, the first expansion device enabling a portion of the liquid refrigerant delivered from the second core tank to vaporize into refrigerant gas; and a routing system wherein in a first operational condition the refrigerant gas from the high pressure tank is routed to the first core tank to increase the pressure within the first core tank and refrigerant gas within the second core tank is routed to the low pressure tank, and wherein in a second operational condition the refrigerant gas from the high pressure tank is routed to the second core tank to increase the pressure within the second core tank and refrigerant gas within the first core tank is routed to the low pressure tank; and (B) with the routing system set in the first operational condition, increasing the pressure in the first core tank by delivering refrigerant gas from the high pressure tank to the first core tank; forcing liquid refrigerant from the first core tank to the second core tank through the second expansion valve, thereby vaporizing a portion of the liquid refrigerant entering the second core tank; delivering refrigerant gas from the second core tank to the low pressure tank; compressing the refrigerant gas from the low pressure tank and delivering it to the high pressure tank; liquifying the compressed gas to be liquified by passing it through the liquid refrigerant in the second core tank; (C) setting the routing system in the second operational condition, increasing the pressure in the second core tank by delivering refrigerant gas from the high pressure tank to the second core tank; forcing liquid refrigerant from the second core tank to the first core tank through the first expansion valve, thereby vaporizing a portion of the liquid refrigerant entering the first core tank; delivering refrigerant gas from the first core tank to the low pressure tank; compressing the refrigerant gas from the low pressure tank and delivering it to the high pressure tank; liquifying the compressed gas to be liquified by passing it through the liquid refrigerant in the first core tank; and repeating steps (B) and (C). Further, the invention is such a gas liquification method further comprising the step of insulating the first and second core tanks; wherein the step of delivering the refrigerant gas to the high pressure tank includes passing the refrigerant gas through a heat exchanger to lower the temperature; and/or further comprising the step of providing one-way check valves such that the refrigerant gas can only flow from the routing system to the low pressure tank to the compressing device to the high pressure tank to the routing system.

Alternately, the invention is a method of producing liquified gas comprising the steps of: (A) increasing the pressure in a first core tank by delivering refrigerant gas from a high pressure tank to the first core tank; forcing liquid refrigerant from the first core tank to a second core tank through a second expansion valve, thereby vaporizing a portion of the liquid refrigerant entering the second core tank; delivering refrigerant gas from the second core tank to a low pressure tank; compressing the refrigerant gas from the low pressure tank and delivering it to a high pressure tank; passing compressed gas to be liquified through the liquid refrigerant in the second core tank; (B) increasing the pressure in the second core tank by delivering refrigerant gas from the high pressure tank to the second core tank; forcing liquid refrigerant from the second core tank to the first core tank through a first expansion valve, thereby vaporizing a portion of the liquid refrigerant entering the first core tank; delivering refrigerant gas from the first core tank to the low pressure tank; compressing the refrigerant gas from the low pressure tank and delivering it to the high pressure tank; passing the compressed gas to be liquified through the liquid refrigerant in the first core tank; and repeating steps (A) and (B). Furthermore, the invention as above further comprising the step of insulating the first and second core tanks; wherein the step of delivering the refrigerant gas to the high pressure tank includes passing the refrigerant gas through a heat exchanger to lower the temperature; and/or further comprising the step of providing one-way check valves such that the refrigerant gas can only flow from the routing system to the low pressure tank to the compressing device to the high pressure tank to the routing system.

DETAILED DESCRIPTION OF THE INVENTION

Figure 1:
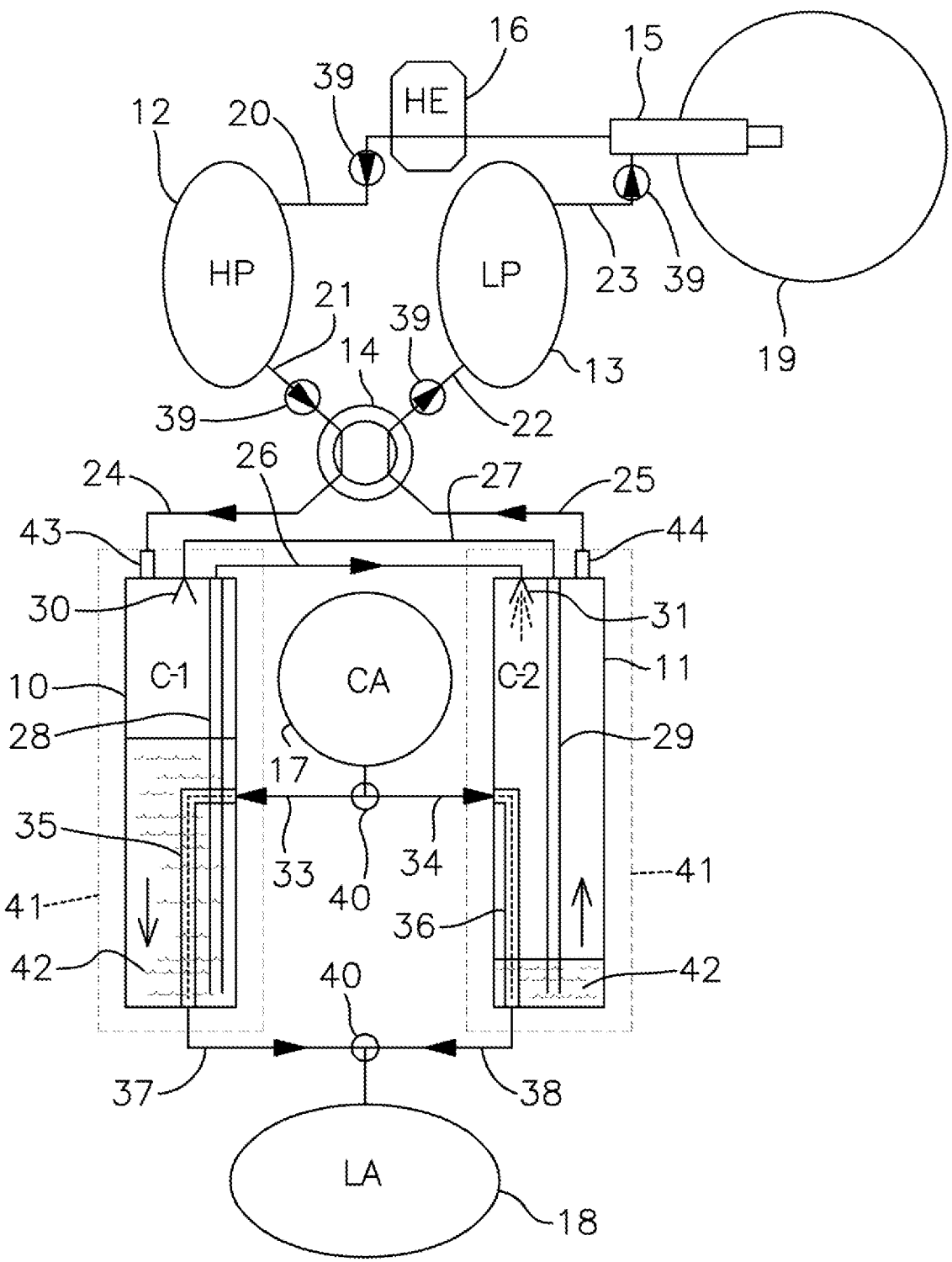
FIG. 1 is a schematic illustration of the liquid air production system at the point in the cycle when high pressure refrigerant gas is being routed to the first core tank and liquid refrigerant is being forced from the first core tank to the second core tank, such that a portion of the liquid refrigerant vaporizes and absorbs heat, and is then passed into the low pressure tank for compression and delivery into the high pressure tank, while the remainder of the liquid refrigerant partially fills the second core tank and cools the compressed air passing through the condensing tube to convert it to liquid air.

With reference to the drawings, which are intended to disclose the invention in an illustrative manner without narrowing the scope of the invention, the invention will now be described in detail. For ease of discussion, the method and system will be described with reference to the production of liquid air from compressed air (in gas form) as being the compressed gas to be liquified, but it is to be understand that this is simply a convention and the subject gas to be liquified is not limited to air, but may also be for example hydrogen or other similar gases capable of transforming from a gas to a liquid under certain pressure/temperature conditions.

The invention in various embodiments is both a liquification method and a liquification system for the production of a liquified gas, such as liquid air. The liquid air production system comprises in general a first core tank 10 and second core tank 11 of suitable construction retaining a refrigerant having a temperature/pressure dependent, liquid/gas phase change, such as nitrogen, a high pressure tank 12 of suitable construction retaining the refrigerant in the gas or vapor state, a low pressure tank 13 of suitable construction retaining the refrigerant in the gas or vapor state, a tank or other source 17 of compressed air, a tank or pipeline 18 receiving the liquid air when produced, a cylinder or similar pumping or compressing device 15 in communication with the high pressure tank 12 and low pressure tank 13, and a power device or mechanism 19 to operate the cylinder, the various elements being connected in communicating manner by tubes or conduits of suitable construction, as explained in more detail below.

First core tank 10 comprises a first inlet/outlet port 43 for passage of refrigerant vapor, an internally disposed first liquid delivery tube 28 for dispensing liquid refrigerant 42 from the first core tank through first liquid line 26 into the second core tank 11. Second core tank 11 comprises a second inlet/outlet port 44 for passage of refrigerant vapor, an internally disposed second liquid delivery tube 29 for dispensing liquid refrigerant 42 from the second core tank 11 through second liquid line 27 into the first core tank 11. Each of the liquid delivery tubes 28/29 extend to near the bottom of the respective core tank 10/11 and are open on the bottom end such that liquid refrigerant is drawn from the lower portion of each core tank 10/11 for transfer to the other core tank 10/11.

First core tank 10 further comprises a first expansion device 30, such as an expansion valve, orifice, turbo-expander, expansion turbine or the like, in communication with second liquid line 27 for receiving the liquid refrigerant 42 from the second liquid delivery tube 29 of the second core tank 11. Second core tank 11 further comprises a second expansion device 31, such as an expansion valve, orifice, turbo-expander, expansion turbine or the like, in communication with first liquid line 26 for receiving the liquid refrigerant 42 from the first liquid delivery tube 28 of the first core tank 10.

As the core tanks 10/11 are to be maintained with an internal temperature significantly below ambient temperature, each core tank 10/11, as well as high pressure tank 12 and low pressure tank 13, is positioned within an insulation system 41. The insulation system 41 may comprise, for example an external shell or tank, with the space between the shell and the core tanks 10/11 being filled with insulating material, maintained at a vacuum, etc.

A distribution valve or routing system 14, such as a four-way distribution valve or similar mechanism as illustrated herein, connects each inlet-outlet port 43/44 to both the high pressure tank 12 and the low pressure tank 13 in a manner that allows the routing of refrigerant gas from the high pressure tank 12 to one or the other of core tanks 10/11 while simultaneously routing refrigerant gas from the opposite core tank 10/11 to the low pressure tank 13. A high pressure outlet line 21 containing a one-way check valve 39 connects the high pressure tank 12 to the distribution valve 14 such that refrigerant gas may only travel from the high pressure tank 12 to the distribution valve. A low pressure inlet line 22 containing a one-way check valve 39 connects the distribution valve 14 to the low pressure tank 13 such that refrigerant gas may only travel from the distribution valve 14 to the low pressure tank. A two-way first gas line 24 connects the distribution valve 14 to the first port 43 of core tank 10 and a two-way second gas line 25 connects the distribution valve 14 to the second port 44 of second core tank 11.

Figure 2:
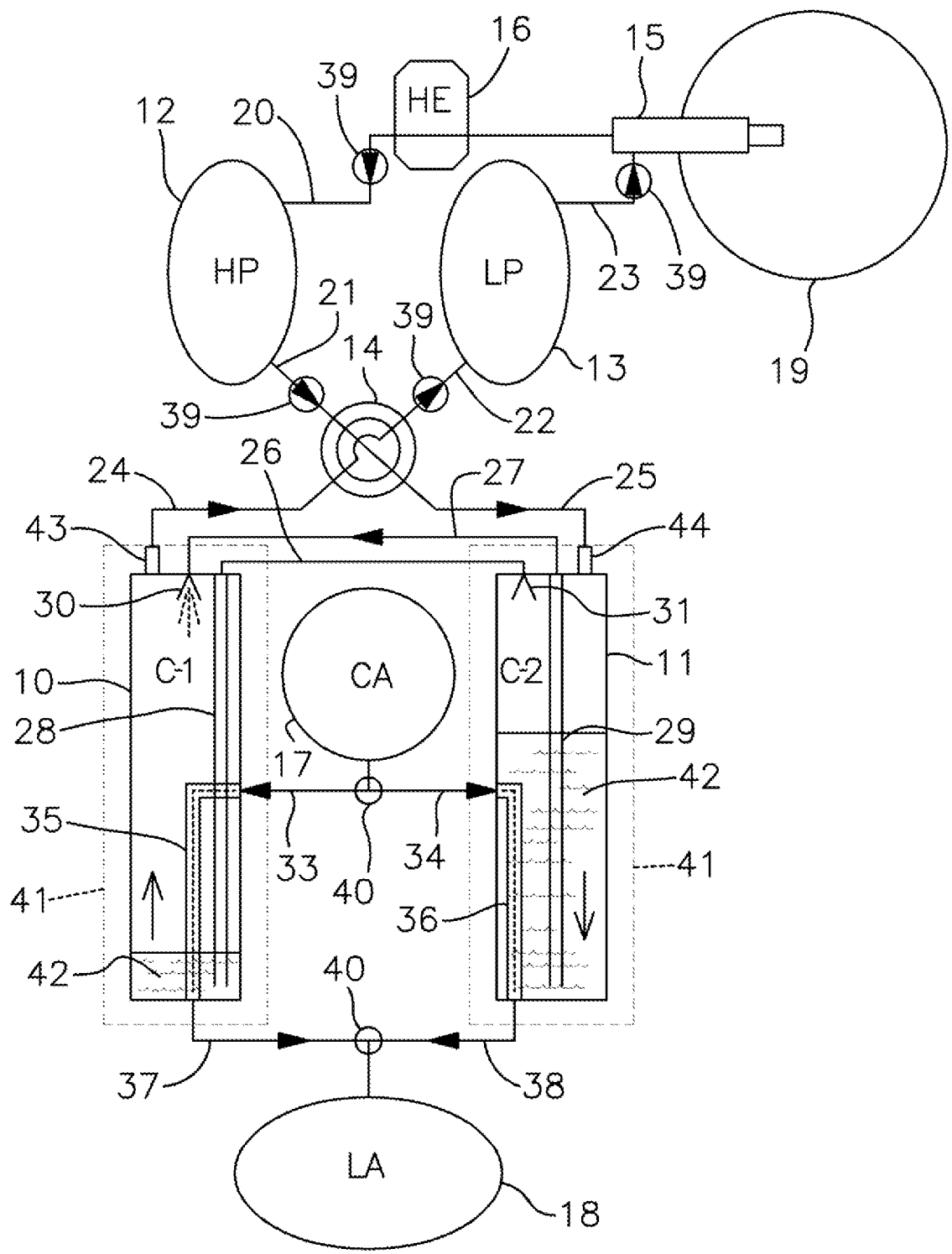
FIG. 2 is a schematic illustration of the liquid air production system at the point in the cycle when high pressure refrigerant gas is being routed to the second core tank and liquid refrigerant is being forced from the second core tank to the first tank, such that a portion of the liquid refrigerant vaporizes and absorbs heat, and is then passed into the low pressure tank for compression and delivery into the high pressure tank, while the remainder of the liquid refrigerant partially fills the second core tank and cools the compressed air passing through the condensing tube to convert it to liquid air.

The distribution valve 14 has two operational conditions which cycle back and forth during operation of the system. In a first condition, as shown in FIG. 1, the distribution valve 14 is positioned such that refrigerant gas flows from the high pressure tank 12 through the distribution valve 14 to the first port 43 of first core tank 10. Simultaneously, refrigerant gas flows from the second port 44 of second core tank 11 through the distribution valve 14 to the low pressure tank 13. In a second condition, as shown in FIG. 2, the distribution valve 14 is positioned such that refrigerant gas flows from the high pressure tank 12 through the distribution valve 14 to the second port 44 of second core tank 11 while simultaneously refrigerant gas flows from the first port 43 of first core tank 10 through the distribution valve 14 to the low pressure tank 13.

The pressurizing cylinder or pumping device 15, which may comprise one or more piston type devices, is operated by a power device 19 such as an electric motor, gas motor, wind machine, hydro turbine or any other similar power device, the combination being the system used to pressurize the refrigerant gas returned from the core tanks 10/11. The cylinder 15 is connected to the low pressure tank 13 by a low pressure outlet line 23 containing a one-way check valve 39 such that refrigerant gas may only travel from the low pressure tank 13 to the cylinder 15. The cylinder 15 is connected to the high pressure tank 12 by a high pressure inlet line 20 containing a one-way check valve 39 such that refrigerant gas may only travel from the cylinder 15 to high pressure tank 13. The cylinder 15 thus maintains the elevated pressure of the high pressure tank 12. The refrigerant gas is preferably delivered to the high pressure tank 12 through a heat exchanger 16 to reduce the temperature of the refrigerant gas. The pressure within the high pressure tank 12 at a much higher pressure than that of the low pressure tank 13. For example, where nitrogen is the refrigerant, the nitrogen gas in the low pressure tank 13 may be maintained at approximately 100 psi, while the nitrogen gas in the high pressure tank 12 is preferably maintained at approximately 1000-1500 psi.

The compressed air (or any compressed gas to be liquified) source or tank 17 is connected by a first air line 33 to a first condensing tube 35 passing through and within the lower portion of the first core tank 10 and is connected by a second air line 34 to a second condensing tube 36 passing through and within the lower portion of the second core tank 11. The condensing tubes 35/36 act in effect as heat exchangers, such that the low temperature liquid refrigerant 42 cools the condensed air and a sufficient amount of heat is removed from the condensed air to liquify the air as it passes through. The condensing tubes 35/36 may be linear, angled, coiled, etc., in order to provide increased surface area and sufficient exposure time to the liquid refrigerant 42. The condensing tubes 35/36 may be configured so as to be completely covered by the liquid refrigerant 42 even when the liquid refrigerant 42 is at the minimum level in the core tank 10/11. An air control valve 40 may be provided to alternate flow of the compressed air through the air lines 33/34 to the two core tanks 10/11 if needed. Alternatively, the air flow may be continuous through both air lines 33/34. A first liquid air line 37 delivers liquid air from the first condensing tube 35 to a liquid air tank or pipeline 18. A second liquid air line 38 delivers liquid air from the second condensing tube 36 to a liquid air tank or pipeline 18. Control, handling and storage of the liquid air is addressed in normal manner, such as with venting of air formed in the liquid tank or pipeline 18 if required. Flow of the liquid air through the liquid air lines 37/38 from the two core tanks 10/11 may be controlled by another air control valve 40 or by one-way check valves (not shown) if needed. The compressed air is preferably delivered into the core tanks 10/11 at greater than 50 psi and most preferably at several hundred psi, as the temperature required to liquify the air is inversely proportional to the pressure. For example, air delivered at approximately 50 psi will liquify at approximately −164 degrees C., while air delivered at approximately 100 psi will liquify at approximately −150 degrees C. Thus, increasing the pressure of the compressed air passing through the condensing tubes 35/36 lowers the conversion temperature required to produce liquid air.

The method of producing liquid air from compressed air (or any compressed gas to be liquified) comprises a cycling operation whereby liquid refrigerant 42 is transferred back and forth between the two core tanks 10/11. Each core tank 10/11 contains a quantity of liquid refrigerant 42, as the core tanks 10/11 are maintained within a temperature/pressure range that prevents the refrigerant from converting to the gas phase. When nitrogen is used as the refrigerant, the core tanks 10/11 are preferably maintained at a minimum pressure of approximately 300 psi up to as much as 1000-1500 psi, which enables the core tanks 10/11 to be maintained at a temperature below approximately −175 degrees C. during the liquification operation.

When the quantity of liquid refrigerant 42 is at a pre-determined minimum level in one core tank (e.g., second core tank 11), as determined by suitable sensing devices, the quantity of liquid refrigerant 42 in the other core tank (e.g., first core tank 10) will be at its maximum. This condition is illustrated in FIG. 1. At this point in the cycle the distribution valve 14 is positioned such that high pressure refrigerant gas is delivered from the high pressure tank 12 into the first port 43 of first core tank 10, while simultaneously connecting the second core tank 11 to the low pressure tank 13. The introduction of high pressure refrigerant gas raises the pressure in the first core tank 10 and forces liquid refrigerant 42 up into the open end of the first liquid delivery tube 28, through the first liquid line 26 and then through the second expansion device 31 into the second core tank 11. Expansion of some of the liquid refrigerant 42 results in a phase change from liquid to gas, thereby reducing the temperature in the second core tank 11, which is elevated by heat absorption occurring when the compressed air passing through the second condensing tube 36 changes from gas to liquid. The remainder of the transferred liquid refrigerant 42 raises the level of liquid refrigerant 42 in the second core tank 11 and further cools the second core tank 11. The refrigerant gas created by the second expansion device 31 is drawn from the second core tank 11 into the low pressure tank 13 through the second port 44 and the distribution valve 14.

When the quantity of liquid refrigerant 42 in the first core tank 10 reaches a pre-determined minimum level, as determined by suitable sensing devices, the quantity of liquid refrigerant 42 in the second core tank 11 will now be at its maximum level. At this point the distribution valve 14 is reversed such that high pressure refrigerant gas is delivered from the high pressure tank 12 into the second port 44 of second core tank 11, while simultaneously connecting the first port 43 of first core tank 10 to the low pressure tank 13, thus reversing the cycle such that liquid refrigerant 42 from the second core tank 11 is delivered through the second liquid delivery tube 29, through the second liquid line 27 and through the first expansion device 30 into the first core tank 10, as shown in FIG. 2. As before, expansion of some of the liquid refrigerant 42 results in a phase change from liquid to gas, thereby reducing the temperature in the first core tank 10, which is elevated by heat absorption occurring when the compressed air passing through the first condensing tube 35 changes from gas to liquid. The remainder of the transferred liquid refrigerant 42 raises the level of liquid refrigerant 42 in the first core tank 10 and further cools the first core tank 10. The refrigerant gas so created is drawn from the first core tank 10 into the low pressure tank 13 through the first port 43 and distribution valve 14.

By continuously cycling the liquid refrigerant 42 back and forth between the core tanks 10/11 through the expansion devices 30/31, while correspondingly alternatingly raising the pressure within the core tanks 10/11 by delivering high pressure gas from the high pressure tank 12, the temperatures within the core tanks 10/11 are constantly maintained below the temperature required to efficiently convert the compressed air into liquid air. Physical placement of the liquid air tank 18 below the core tanks 10/11 enables gravity flow of the liquid air. Overall, the system requires a minimum amount of operational equipment, such that the large number of pumps and motors required in other liquification systems are not needed.

Cost minimization may be best accomplished by utilizing a wind machine as the power device 19. The wind machine or alternative power device 19 may also be utilized to compress the air stored in the compressed air supply tank 17.

Wind machines comprise tower structures, and it is possible to utilize the interior of the tower structure to house all or parts of the liquification system. Likewise, floating wind machines may be used to power the cylinders 15, in which case the buoyancy or float members may be used to house all or parts of the liquification system.

The gas liquification system is preferably automated such that the cycling between the two operating conditions occurs automatically, utilizing sensors, controls and processors in known manner, such that there is no need for manual operation or oversight.

It is also possible to utilize the system and method for re-gassing, i.e., converting air or another gas developing in the liquid storage tank 18 back into liquid form, the air or gas normally requiring venting to atmosphere to relieve excessive pressure within the liquid storage tank 18. By routing the air or gas from the liquid tank 18 back into the air or gas source 17, no air or gas is lost to atmosphere. This is particularly useful where venting of gas to atmosphere is dangerous or prohibited.

In one embodiment, the core tanks 10/11 are charged with adequate amounts of liquid refrigerant 42 from an outside source prior to closing the overall system and the initiation of the air liquification cycles. In another, the cycling process as described above may be used to create the liquid refrigerant 42 within empty core tanks 10/11 from nitrogen gas supplied to the high pressure tank 12.

It is understood that equivalents and substitutions for some elements and steps set forth above may be obvious to those of ordinary skill in the art, and therefore the true scope and definition of the invention is to be as set forth in the following claims.

I claim:

1. A gas liquification system comprising:
   a refrigerant in the form of a liquid refrigerant and a refrigerant gas;
   a first core tank retaining a portion of the liquid refrigerant and a portion of the refrigerant gas;
   a second core tank retaining a portion of the liquid refrigerant and a portion of the refrigerant gas;
   a low pressure tank retaining a portion of the refrigerant gas;
   a high pressure tank retaining a portion of the refrigerant gas at a pressure higher than the pressure within the low pressure tank;
   a compressing device in communication with the high pressure tank and the low pressure tank, the compressing device receiving refrigerant gas from the low pressure tank and delivering it to the high pressure tank under increased pressure;
   a gas source providing a compressed gas to be liquified;
   a first condensing tube within the first core tank and extending through the liquid refrigerant retained within the first core tank, and a second condensing tube within the second core tank and extending through the liquid refrigerant retained within the second core tank; the first and second condensing tubes receiving the compressed gas to be liquified from the gas source;
   a first liquid delivery tube positioned within the first core tank and extending into the liquid refrigerant retained within the first core tank and a second expansion device disposed on the second core tank, such that liquid refrigerant from the first core tank is delivered through the first liquid delivery tube into the second core tank through the second expansion device, the second expansion device enabling a portion of the liquid refrigerant delivered from the first core tank to vaporize into refrigerant gas;
   a second liquid delivery tube positioned within the second core tank and extending into the liquid refrigerant retained within the second core tank and a first expansion device disposed on the first core tank, such that liquid refrigerant from the second core tank is delivered through the second liquid delivery tube into the first core tank through the first expansion device, the first expansion device enabling a portion of the liquid refrigerant delivered from the second core tank to vaporize into refrigerant gas; and
   a routing system wherein in a first operational condition the refrigerant gas from the high pressure tank is routed to the first core tank to increase the pressure within the first core tank and refrigerant gas within the second core tank is routed to the low pressure tank, and wherein in a second operational condition the refrigerant gas from the high pressure tank is routed to the second core tank to increase the pressure within the second core tank and refrigerant gas within the first core tank is routed to the low pressure tank.

2. The gas liquification system of claim 1, wherein the routing system comprises a four-way distribution valve.

3. The gas liquification system of claim 1, wherein the compressing device comprises a cylinder operated by a power device, the power device being chosen from the group of power devices consisting of electric motors, gas motors, wind machines and hydro turbines.

4. The gas liquification system of claim 1, further comprising a heat exchanger disposed between the compressing device and the high pressure tank.

5. The gas liquification system of claim 1, wherein the first and second expansion devices are chosen from the group of expansion devices consisting of valves, orifices, turbo-expanders expansion turbines.

6. The gas liquification system of claim 1, wherein the first and second core tanks are insulated.

7. The gas liquification system of claim 1, wherein the first and second core tanks are disposed within a vacuum.

8. The gas liquification system of claim 1, wherein the first and second condensing tubes are coiled.

9. The gas liquification system of claim 1, wherein the routing system comprises a four-way distribution valve; the compressing device comprises a cylinder operated by a power device, the power device being chosen from the group of power devices consisting of electric motors, gas motors, wind machines and hydro turbines; wherein the gas liquification system further comprises a heat exchanger disposed between the compressing device and the high pressure tank; and wherein the first and second expansion devices are chosen from the group of expansion devices consisting of valves, orifices, turbo-expanders expansion turbines.

10. The gas liquification system of claim 9, wherein the first and second core tanks are insulated; wherein the first and second core tanks are disposed within a vacuum; and wherein the first and second condensing tubes are coiled.

11. A gas liquification method comprising the steps of:
    (A) providing a refrigerant in the form of a liquid refrigerant and a refrigerant gas; a first core tank retaining a portion of the liquid refrigerant and a portion of the refrigerant gas; a second core tank retaining a portion of the liquid refrigerant and a portion of the refrigerant gas; a low pressure tank retaining a portion of the refrigerant gas; a high pressure tank retaining a portion of the refrigerant gas at a pressure higher than the pressure within the low pressure tank; a compressing device in communication with the high pressure tank and the low pressure tank, the compressing device receiving refrigerant gas from the low pressure tank and delivering it to the high pressure tank under increased pressure; a gas source providing a compressed gas to be liquified; a first condensing tube within the first core tank and extending through the liquid refrigerant retained within the first core tank, and a second condensing tube within the second core tank and extending through the liquid refrigerant retained within the second core tank; the first and second condensing tubes receiving the compressed gas to be liquified from the compressed gas source; a first liquid delivery tube positioned within the first core tank and extending into the liquid refrigerant retained within the first core tank and a second expansion device disposed on the second core tank, such that liquid refrigerant from the first core tank is delivered into the second core tank from the first liquid delivery tube to the second expansion device, the second expansion device enabling a portion of the liquid refrigerant delivered from the first core tank to vaporize into refrigerant gas; a second liquid delivery tube positioned within the second core tank and extending into the liquid refrigerant retained within the second core tank and a first expansion device disposed on the first core tank, such that liquid refrigerant from the second core tank is delivered into the first core tank from the second liquid delivery tube to the first expansion device, the first expansion device enabling a portion of the liquid refrigerant delivered from the second core tank to vaporize into refrigerant gas; and a routing system wherein in a first operational condition the refrigerant gas from the high pressure tank is routed to the first core tank to increase the pressure within the first core tank and refrigerant gas within the second core tank is routed to the low pressure tank, and wherein in a second operational condition the refrigerant gas from the high pressure tank is routed to the second core tank to increase the pressure within the second core tank and refrigerant gas within the first core tank is routed to the low pressure tank; and (B) with the routing system set in the first operational condition, increasing the pressure in the first core tank by delivering refrigerant gas from the high pressure tank to the first core tank;

forcing liquid refrigerant from the first core tank to the second core tank through the second expansion device, thereby vaporizing a portion of the liquid refrigerant entering the second core tank;

delivering refrigerant gas from the second core tank to the low pressure tank;

compressing the refrigerant gas from the low pressure tank and delivering it to the high pressure tank;

liquifying the compressed gas to be liquified by passing it through the liquid refrigerant in the second core tank;

(C) setting the routing system in the second operational condition, increasing the pressure in the second core tank by delivering refrigerant gas from the high pressure tank to the second core tank;

forcing liquid refrigerant from the second core tank to the first core tank through the first expansion device, thereby vaporizing a portion of the liquid refrigerant entering the first core tank;

delivering refrigerant gas from the first core tank to the low pressure tank;

compressing the refrigerant gas from the low pressure tank and delivering it to the high pressure tank;

liquifying the compressed gas to be liquified by passing it through the liquid refrigerant in the first core tank; and repeating steps (B) and (C).

12. The gas liquification method of claim 11, further comprising the step of insulating the first and second core tanks.

13. The gas liquification method of claim 11, wherein the step of delivering the refrigerant gas to the high pressure tank includes passing the refrigerant gas through a heat exchanger to lower the temperature.

14. The gas liquification method of claim 11, further comprising the step of providing one-way check valves such that the refrigerant gas can only flow from the routing system to the low pressure tank to the compressing device to the high pressure tank to the routing system.

15. A method of producing liquified gas comprising the steps of:

(A) increasing the pressure in a first core tank by delivering refrigerant gas from a high pressure tank to the first core tank;

forcing liquid refrigerant from the first core tank to a second core tank through a second expansion valve, thereby vaporizing a portion of the liquid refrigerant entering the second core tank;

delivering refrigerant gas from the second core tank to a low pressure tank;

compressing the refrigerant gas from the low pressure tank and delivering it to the high pressure tank;

passing a compressed gas to be liquified from a gas source through the liquid refrigerant in the second core tank to produce liquified gas;

(B) increasing the pressure in the second core tank by delivering refrigerant gas from the high pressure tank to the second core tank;

forcing liquid refrigerant from the second core tank to the first core tank through a first expansion valve, thereby vaporizing a portion of the liquid refrigerant entering the first core tank;

delivering refrigerant gas from the first core tank to the low pressure tank;

compressing the refrigerant gas from the low pressure tank and delivering it to the high pressure tank;

passing the compressed gas to be liquified from the gas source through the liquid refrigerant in the first core tank to produce liquified gas; and repeating steps (A) and (B).

16. The gas liquification method of claim 15, further comprising the step of insulating the first and second core tanks.

17. The gas liquification method of claim 15, wherein the step of delivering the refrigerant gas to the high pressure tank includes passing the refrigerant gas through a heat exchanger to lower the temperature.

18. The gas liquification system of claim 1, further comprising:

a control valve disposed between the gas source and the first and second condensing tubes, the control valve delivering the compressed gas to be liquified from the gas source to the first condensing tube or to the second condensing tube in alternating manner.

* * * * *